Patented Feb. 12, 1952

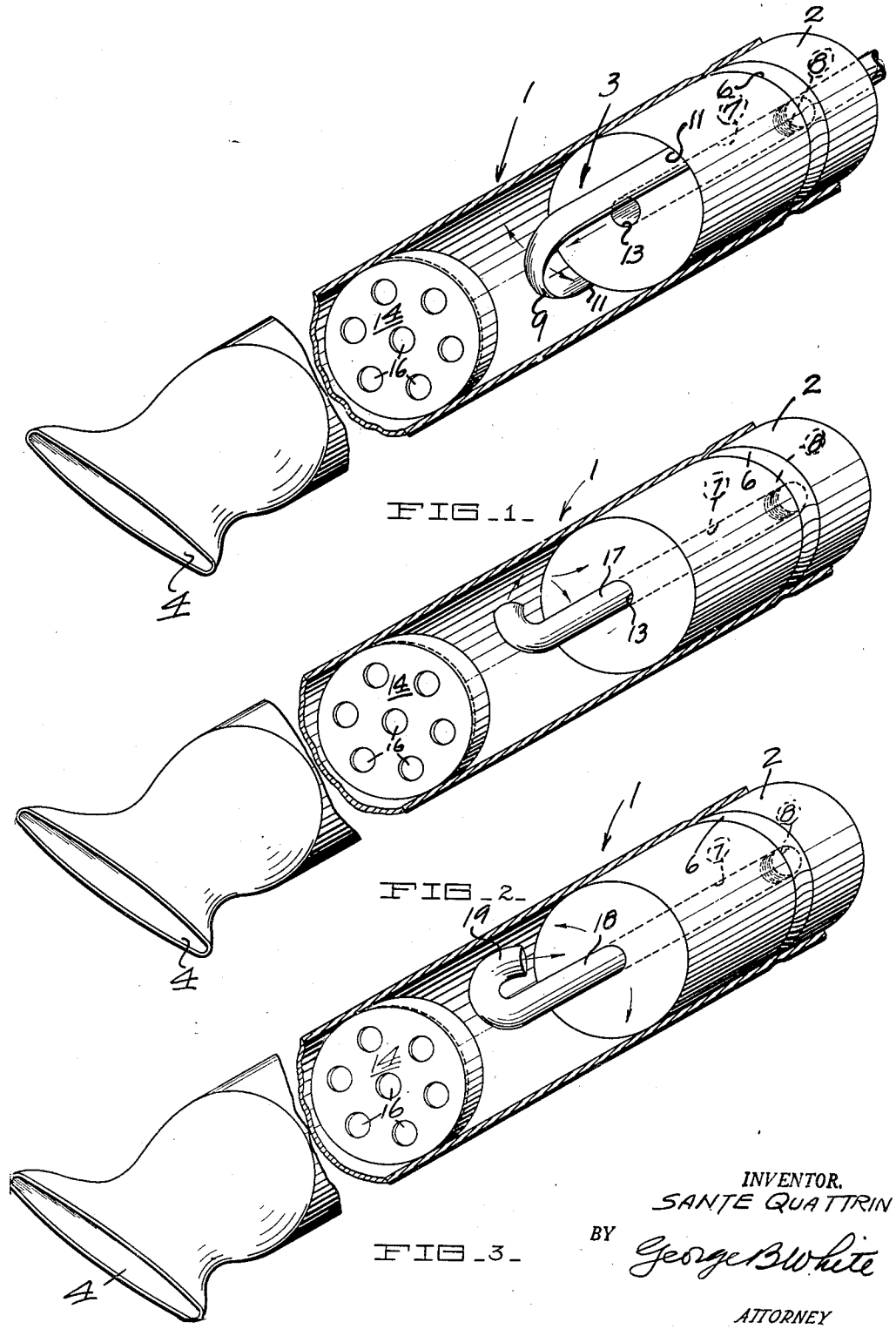

2,585,346

UNITED STATES PATENT OFFICE 2,585,346

IRRIGATION NOZZLE

Sante Quattrin, San Francisco, Calif.

Application December 20, 1949, Serial No. 134,000

5 Claims. (Cl. 299—154)

This invention relates to an irrigation nozzle.

The primary object of this invention is to provide a nozzle which can be readily attached to a usual garden hose or the like, and which reduces the force of the waterflow from such hose without diminishing the volume of the flow, and which is adapted to irrigate the roots of the plant without washing away the soil from the base of the plant.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a perspective view of the preferred embodiment of my nozzle, shown partly in section.

Fig. 2 is a perspective view of a modified embodiment of my nozzle.

Fig. 3 is a perspective view of another modified form of my nozzle.

In its general organization my nozzle includes an outer conduit 1, a plug conduit 2 fastened in the intake end of the outer conduit 1 and adapted to be connected to the end of a usual hose or pipe, flow spreader or divider means 3 to break the pressure of the water flow, and a flattened outlet mouth 4.

The outer conduit 1 is of considerably larger diameter than the usual garden hose or pipe diameter. The plug conduit 2 is generally cylindrical, and it has an annular groove 6 on its outer periphery. The outer conduit 1 is crimped around and into said annular groove 6 to fasten the plug conduit 2 in place.

The plug conduit 2 has a longitudinal generally axial, passage 7 therethrough. The intake end 8 of the passage 7 is suitably threaded to accommodate the usual ferrule or coupling on the end of a garden hose or pipe therein for securing the nozzle in place.

The pressure reducer means 3 in the form shown in Fig. 1 is a band or strap 9, generally U shaped; the free ends 11 of the band 9 are suitably fixed to the end of the plug conduit so as to space the loop of the band 9 from the outlet end 13 of the passage 7. The loop of the band 9 extends transversely across the outer conduit 1 so that the flow issuing from the outlet end 13 of the plug passage 7 strikes said loop and is thereby divided and directed laterally toward the inner periphery of the outer conduit 1.

A disc cup 14 pressed in place across the outer conduit 1 is spaced from said band 9 and has perforations 16 therethrough to further break the force of flow through the outer conduit 1.

The transversely flattened mouth 4 of the outer conduit 1 spreads the flow laterally. This outlet end is a flatly tapering or converging end to facilitate the penetration of the nozzle into the soil at the base of the plant, where the gentle irrigation flow is applied in suitable volume, but without turbulence or force on the soil.

The form shown in Fig. 2 differs from the first described form in that an integral tube 17 extends from the outlet end 13 of the plug passage 7, which tube is bent to turn laterally to discharge toward the periphery of the conduit 1. Thus the flow is broken by its impingement to one side.

The form shown in Fig. 3 differs from the previously described forms in that an integral tube 18 extends from the outlet end 13 of the plug passage 7 and has its end or tip 19 bent around to point and discharge toward the plug conduit 2, but spaced from the latter. Thus the force of the water flow is broken by splashing it against the end of the plug conduit 1 and then against the periphery of the outer conduit 1.

My irrigation nozzle can be used either on the surface or easily inserted into the soil; and efficient irrigation is achieved without washing away the soil at the surface or without washing a hole under ground.

I claim:

1. An irrigation nozzle comprising an outer conduit, a fixed element covering an end of said conduit and having a longitudinal passage therethrough, means for securing said passage to a supply conduit, said passage being of substantially smaller diameter than the diameter of said outer conduit, and a flow spreader element to spread the flow issuing from said passage and to change the direction of said flow for reducing its velocity, said flow spreader and velocity reducing element being a bent strip of lesser width than the width of said conduit extended across said conduit with the concave side of said strip opposite to and spaced from said passage.

2. An irrigation nozzle comprising an outer conduit, a fixed element covering an end of said conduit and having a longitudinal passage therethrough, means for securing said passage to a supply conduit, said passage being of substantially smaller diameter than the diameter of said outer conduit, and a flow spreader element to spread the flow issuing from said passage and to change the direction of said flow for reducing its velocity, said flow spreader and velocity reducing element being a tube extended into the conduit in continuation of said passage, the end of said tube being bent to direct the discharge therefrom toward a side of said outer conduit.

3. An irrigation nozzle comprising an outer conduit, a fixed element covering an end of said conduit and having a longitudinal passage therethrough, means for securing said passage to a supply conduit, said passage being of substantially smaller diameter than the diameter of said outer conduit, and a flow spreader element to spread the flow issuing from said passage and to change the direction of said flow for reducing its velocity, said flow spreader and velocity reducing element being a tube extended into the conduit in continuation of said passage, the end of said tube being bent and turned back toward said covering element to discharge the flow generally oppositely to the direction of flow through said passage.

4. In an irrigation nozzle of the character described, a conduit, a fixed closure element closing an end of the conduit, an outwardly flaring flat discharge at the other end of the conduit being wider than the diameter of the conduit, said closure element having a generally axial passage therethough, means at the intake end of said passage adapted for the attachment of a supply conduit thereto, said passage being substantially of the same diameter as the passage of said supply conduit and being smaller than the diameter of the first conduit, and a bent obstruction element in said first conduit, said bent element having its concave side opposite said passage to stop the force of flow from said passage and permit spreading of the fluid into said first conduit and out through said discharge.

5. In an irrigation nozzle of the character described, an outer conduit having a generally cylindrical intake end, a plug secured in said intake end, a generally axial passage through said plug, the outer end of said passage being adapted to connect to a supply conduit of about same inner diameter as that of said passage, and an obstruction element constituting a loop-shaped strip narrower than the width of said conduit and wider than said passage being extended from the inner end of said plug and across said conduit spaced from and opposite to the inner end of said passage with the concave loop-side facing said passage to stop the force of flow issuing from said passage and permit the lateral spreading of the fluid into said conduit.

SANTE QUATTRIN.

REFERENCES CITED

The following references are of record in the file of this patent:

UNITED STATES PATENTS

| Number | Name | Date |
| --- | --- | --- |
| 223,332 | Fox | Jan. 6, 1880 |
| 1,445,208 | Forward | Feb. 13, 1923 |
| 1,883,656 | Estock | Oct. 18, 1932 |
| 1,919,365 | Gilsenan | July 25, 1933 |
| 2,028,555 | McDowell et al. | Jan. 21, 1936 |
| 2,069,733 | Zinkl | Feb. 2, 1937 |
| 2,210,846 | Aghnides | Aug. 6, 1940 |
| 2,420,958 | Landreth | May 20, 1947 |